United States Patent Office 2,766,295
Patented Oct. 9, 1956

2,766,295

DEHALOGENATION OF HALO-SUBSTITUTED HYDROXY AROMATIC COMPOUNDS

William K. T. Gleim, Orland Park, Ill., assignor to Universal Oil Products Company, Des Plaines, Ill., a corporation of Delaware No Drawing. Application December 15, 1954, Serial No. 475,582

19 Claims. (Cl. 260—621)

This invention relates to a process for dehalogenating halo-substituted hydroxy aromatic compounds, and more particularly to a process for dehalogenating halophenols.

It is an object of this invention to prepare hydroxy-substituted aromatic compounds from the corresponding halo-substituted hydroxy aromatic compounds.

A more specific object of this invention is to prepare phenols from halo-substituted phenols.

One embodiment of this invention resides in a process for the dehalogenating of a halo-substituted hydroxy aromatic compound by treating said compound in the presence of a dehalogenating agent selected from the group consisting of water, ammonia or a primary amine, and recovering the resultant hydroxy aromatic compound.

A specific embodiment of the invention resides in a process for the dehalogenating of a halophenol by treating said halophenol in the presence of ammonia or a primary amine at a temperature in the range of from about 225° to about 260° C. and at a pressure up to about 200 atmospheres, and recovering the resultant phenol.

Another specific embodiment of the invention resides in a process for the dehalogenation of the halophenol by treating said halophenol with water at a temperature in the range of from about 225° to about 260° C. and at a pressure in the range of from about 25 atmospheres to about 50 atmospheres, and recovering the resultant phenol.

A more specific embodiment of the invention resides in a process for the dechlorination of o-chlorophenol by treating said o-chlorophenol in the presence of aniline, at a temperature in the range of from about 225° to about 260° C. and at a nitrogen pressure in the range of from about 15 to about 25 atmospheres, and recovering the resultant phenol.

Other objects and embodiments of the present invention referring to alternative halo-substituted hydroxy aromatic compounds and alternative dehalogenating agents will be found in the following further detailed description.

It has now been discovered that hydroxy-substituted aromatic hydrocarbons and particularly phenols, which are useful in the preparation of plastics, plasticizers, additives for gasoline, etc., and as intermediates in the preparation of other organic compounds may be prepared by dehalogenating a halo-substituted hydroxy aromatic hydrocarbon. This dehalogenation is brought about by treating the halo-substituted compound at elevated temperatures and pressures with a dehalogenating agent, which comprises water, ammonia, and mono-substituted ammonia. The primary amines which may be used include aliphatic amines such as methylamine, ethylamine, diethyl triamine, propylamine, butylamine, etc.; aromatic amines such as aniline, benzylamine, o-toluidine, m-toluidine, p-toluidine, o-ethylbenzyl amine, m-ethylbenzyl amine, p-ethylbenzyl amine, etc.; α-naphthylamine, β-naphthylamine, α-methyl-β-naphthylamine, α-ethyl-β-naphthylamine, α-anthracyl amine, β-anthracyl amine, δ-anthracyl amine, the phenanthryl-, chrysyl- and pyrylamines, etc., cycloalkyl amines such as cyclopentyl amine, methylcyclopentyl amine, cyclohexyl amine, methylcyclohexyl amine, ethylcyclohexyl amine, etc. It has also been found that water, with or without HCl present, will also act as a dehalogenating agent for the process of this invention. It has further been found that the use of secondary and tertiary amines such as pyrolidine or pyridine as dehalogenating agents does not produce a hydroxy-substituted aromatic compound as the primary yield of the reaction, but rather a polymer.

Examples of halo-substituted hydroxy aromatic compounds which may be dehalogenated in the process of the present invention include o-chlorophenol, m-chlorophenol, p-chlorophenol, o-, m-, and p-bromophenol, 2-chloro-α-hydroxynaphthalene, 3-chloro-α-hydroxynaphthalene, 4-chloro-α-hydroxynaphthalene, 3-choloro-β-hydroxynaphthalene, 4-chloro-β-hydroxynaphthalene, etc., α-chloro-β-hydroxyanthracene, α-bromo-β-hydroxyanthracene, α-chloro-δ-hydroxyanthracene, etc., 1-chloro-2-hydroxyphenanthrene, 1-bromo-2-hydroxyphenanthrene, 1-chloro-2-hydroxychrysene, 1-bromo-2-hydroxychrysene, etc., 1-bromo-2-hydroxypyrene, 1-chloro-2-hydroxypyrene, etc.

The process of this invention takes place at elevated temperatures, said temperatures ranging from about 150° to about 300° C. and preferably in the range of from about 225° to about 260° C., with superatmospheric pressures of nitrogen or other inert gases ranging from about 2 to about 200 atmospheres and preferably in the range of from about 15 to about 50 atmospheres.

The process of the present invention may be effected in any suitable manner and may comprise either a batch or continuous type operation. When a batch type operation is used, a quantity of the halo-substituted hydroxy aromatic compound is placed in a suitable apparatus such as an autoclave along with a dehalogenating agent after which the apparatus is heated to about 250° C. Superatmospheric pressure is supplied by charging nitrogen or other inert gases into the reactor. The autoclave is maintained at the desired temperature and pressure for a period of time ranging from about 2 to about 12 hours, at the end of which time the autoclave and contents thereof is cooled to room temperature and the pressure released. The desired phenol is separated from the unreacted starting materials by conventional means, that is, by fractional distillation, crystallization, etc.

Another type of process of the present invention comprises the continuous type operation. In this operation the starting material is continuously charged to a reactor, said reactor being maintained at the desired operating conditions of temperature and pressure. The dehalogenating agent and the gases providing the pressure are also continuously charged to this reactor by separate means. The reaction vessel may comprise an unlined reactor or coil, or it may contain a solid adsorbent material such as alumina, fire brick, dehydrated bauxite, and the like. The reaction product comprising a hydroxy-substituted aromatic hydrocarbon is then continuously withdrawn after completion of the required residence time, separated from the reactor effluent and purified by conventional means hereinbefore described. The unreacted starting materials may be recycled to the reactor to form a portion of the feed stock.

The following examples are given to illustrate the process of the present invention which, however, are not intended to limit the generally broad scope of the present invention in strict accordance therewith.

*Example I*

One mole proportion of o-chlorophenol and 3 mole proportions of aniline were placed in a rotating autoclave having a 1750 ml. capacity. The vessel was then heated to a temperature of 250° C. at 20 atmospheres of nitrogen pressure for a period of approximately 4 hours. At the end of this time the autoclave and contents thereof was cooled to room temperature and the reaction product separated by fractional distillation under reduced pressure. 54% of the original o-chlorophenol was dehalogenated to form phenol.

*Example II*

1 mole proportion of o-chlorophenol and 3 mole proportions of ammonia were placed in an autoclave. The autoclave was heated to a temperature of 250° C. at a nitrogen pressure of 20 atmospheres for a period of 4 hours. At the end of this time the autoclave was cooled to room temperature and the contents thereof separated by the same means hereinbefore described in Example I. 60% of the o-chlorophenol was converted to phenol.

*Example III*

In this experiment 1 mole proportion of p-chlorophenol and 3 mole proportions of aniline along with 1 mole of HCl and 500 g. of H₂O were heated in an autoclave to a temperature of approximately 250° C. for a period of 4 hours at 20 atmospheres of nitrogen pressure. 55% of the p-chlorophenol was converted to phenol.

*Example IV*

1 mole proportion of o-chlorophenol and 3 mole proportions of diethylene triamine were placed in an autoclave. The autoclave was subjected to a pressure of approximately 20 atmospheres of nitrogen at a temperature of 250° C. for a period of 4 hours. At the end of this time the autoclave and contents thereof was allowed to cool to room temperature, and the products subjected to separation and purification by fractional distillation under reduced pressure. 29% of the o-chlorophenol was dehalogenated to form phenol.

*Example V*

1 mole proportion of o-chlorophenol and 500 g. of water were placed in an antoclave. The autoclave was subjected to a pressure of approximately 20 atmospheres of nitrogen at 250° C. for a period of 4 hours. At the end of this time the autoclave and contents thereof was allowed to cool to room temperature, and the products subjected to separation and purification by fractional distillation under reduced pressure. 32% phenol was isolated.

*Example VI*

1 mole proportion of o-chlorophenol, 500 g. of water and 100 g. of concentrated hydrochloric acid were placed in an autoclave. The autoclave was subjected to a pressure of approximately 20 atmospheres of nitrogen at 250° C. for a period of 4 hours. At the end of this time the autoclave and contents thereof was allowed to cool to room temperature and the products subjected to separation and purification by fractional distillation under reduced pressure. 40% phenol was obtained.

I claim as my invention:

1. A process for the dehalogeneration of a halophenol having a halogen selected from the group consisting of chlorine and bromine which comprises treating said halophenol in the presence of a dehalogenating agent selected from the group consisting of water, ammonia and a primary amine at a temperature from about 150° to about 300° C. and a pressure up to about 200 atmospheres, and recovering the resultant hydroxy aromatic compound.

2. A process for the dehalogenation of a halophenol having a halogen selected from the group consisting of chlorine and bromine which comprises treating said halophenol in the presence of a dehalogenating agent selected from the group consisting of water, ammonia and a primary amine at a temperature of from about 225° to about 260° C. and a pressure of from about 2 to about 200 atmospheres, and recovering the resultant phenol.

3. A process for the dehalogenation of a halophenol having a halogen selected from the group consisting of chlorine and bromine which comprises treating said halophenol in the presence of water at a temperature from about 150° to about 300° C. and a pressure up to about 200 atmospheres, and recovering the resultant phenol.

4. A process for the dehalogenation of a halophenol having a halogen selected from the group consisting of chlorine and bromine which comprises treating said halophenol in the presence of ammonia at a temperature from about 150° to about 300° C. and a pressure up to about 200 atmospheres, and recovering the resultant phenol.

5. A process for the dehalogenation of halophenol having a halogen selected from the group consisting of chlorine and bromine which comprises treating said halophenol in the presence of a primary amine at an elevated temperature in the range of from about 150° to 300° C. and a pressure up to about 200 atmospheres, and recovering the resultant phenol.

6. A process for the dehalogenation of halophenol having a halogen selected from the group consisting of chlorine and bromine which comprises treating said halophenol in the presence of a primary amine at an elevated temperature in the range of from about 225° to about 260° C. and a pressure of from about 15 to about 50 atmospheres, and recovering the resultant phenol.

7. A process for the dehalogenation of a halophenol having a halogen selected from the group consisting of chlorine and bromine which comprises treating said halophenol in the presence of a primary amine, at an elevated temperature in the range of from about 225° to about 260° C. and at an elevated pressure in the range of from about 2 to about 200 atmospheres, and recovering the resultant phenol.

8. A process for the dehalogenation of a halophenol having a halogen selected from the group consisting of chlorine and bromine which comprises treating said halophenol in the presence of a primary amine at an elevated temperature in the range of from about 225° to about 260° C. and at an elevated pressure up to about 200 atmospheres and recovering the resultant phenol.

9. A process for the dehalogenation of a chlorophenol which comprises treating said chlorophenol in the presence of aniline at a temperature in the range of from about 225° to about 260° C. and at a nitrogen pressure in the range of from about 15 to about 25 atmospheres, and recovering the resultant phenol.

10. A process for the dehalogenation of a bromophenol which comprises treating said bromophenol in the presence of aniline at a temperature in the range of from about 225° to about 260° C. and at a nitrogen pressure in the range of from about 15 to about 25 atmospheres, and recovering the resultant phenol.

11. A process for the dehalogenation of a chlorophenol which comprises treating said chlorophenol in the presence of ammonia at a temperature in the range of from about 225° to about 260° C. and at a pressure up to about 200 atmospheres, and recovering the resultant phenol.

12. A process for the dehalogenation of a chlorophenol which comprises treating said chlorophenol in the presence of diethyl triamine at a temperature in the range of from about 225° to about 260° C. and at a nitrogen pressure in the range of from about 15 to about 25 atmospheres, and recovering the resultant phenol.

13. A process for the dehalogenation of o-chlorophenol which comprises treating said o-chlorophenol in the presence of aniline at a temperature in the range of from about 200° to about 250° C. and at a nitrogen pressure in the range of from about 15 to about 25 atmospheres, and recovering the resultant phenol.

14. A process for the dehalogenation of o-chlorophenol which comprises treating said o-chlorophenol in the presence of ammonia at a temperature in the range of from about 225° to about 260° C. and at a pressure up to about 200 atmospheres, and recovering the resultant phenol.

15. A process for the dehalogenation of o-bromophenol which comprises treating said o-bromophenol in the presence of aniline at a temperature in the range of from about 225° to about 260° C. and at a nitrogen pressure in the range of from about 15 to about 25 atmospheres, and recovering the resultant phenol.

16. A process for the dehalogenation of 3-chloro-α-hydroxynaphthalene which comprises treating the same in the presence of aniline at a temperature in the range of from about 225° to about 260° C. and at a nitrogen pressure in the range of from about 15 to about 25 atmospheres, and recovering the resultant α-hydroxynaphthalene.

17. A process for the dehalogenation of a halophenol which comprises treating said halophenol in the presence of water at an elevated temperature in the range of from about 225° to about 260° C. and at a superatmospheric pressure in the range of from about 25 to about 50 atmospheres, and recovering the resultant phenol.

18. A process for the dehalogenation of o-chlorophenol which comprises treating said o-chlorophenol in the presence of water at an elevated temperature in the range of from about 225° to about 260° C. and at a superatmospheric pressure in the range of from about 25 to about 50 atmospheres, and recovering the resultant phenol.

19. A process for the dehalogenation of o-bromophenol which comprises treating said o-bromophenol in the presence of ammonia at an elevated temperature in the range of from about 225° to about 260° C. and at a superatmospheric pressure up to about 200 atmospheres, and recovering the resultant phenol.

No references cited.